Oct. 10, 1967    Z. A. FOROULIS    3,346,471
USE OF COMPOSITE D.C. POWER IN ANODIC PROTECTION
Original Filed June 3, 1963    2 Sheets-Sheet 1

FIG. I

Z. ANDREW FOROULIS, Inventor
By Reuben Miller
Patent Agent

Oct. 10, 1967      Z. A. FOROULIS      3,346,471
USE OF COMPOSITE D.C. POWER IN ANODIC PROTECTION
Original Filed June 3, 1963           2 Sheets-Sheet 2

Z. ANDREW FOROULIS, Inventor

By *Reuben Miller*
Patent Agent

United States Patent Office 3,346,471
Patented Oct. 10, 1967

3,346,471
USE OF COMPOSITE D.C. POWER IN
ANODIC PROTECTION
Zisis Andrew Foroulis, Somerville, N.J., assignor to Esso
Research and Engineering Company, a corporation of
Delaware
Continuation of application Ser. No. 284,906, June
3, 1963. This application Mar. 6, 1967, Ser. No.
621,067
2 Claims. (Cl. 204—147)

This application is a continuation of application Ser. No. 284,906, filed June 3, 1963, now abandoned.

The present invention is concerned with a method and apparatus for the anodic passivation of metallic surfaces in contact with corrosive solutions. Particularly, the invention relates to the use of direct current power sources connected with low current capacity potential control devices in the application of anodic passivation techniques to industrial corrosion control operations.

In its simplest terms, anodic protection is the process of passivating an active-passive metal by impressing an external anodic current on the metal. Three electrodes are necessary for anodic protection; the specimen to be protected is made the anode; an inert metal is used for the cathode and an electro-chemical half cell is used as a reference electrode. A potentiostat regulates the current from the cathode to the working electrode (anode) in such a manner that the potential difference between the reference electrode and the anode should be independent of the total cell current. The anode, cathode, and reference electrode are in contact with a conductive fluid.

Anodic protection systems, as contemplated by the instant invention, are operable for the protection of all types of active-passive metals. Generally, most materials of construction including all types of ferrous alloys and stainless steels fall within this category. With the exception of solutions containing chloride ions, which tends to destroy the active-passive state of the metal, active-passive metals can be protected against the corrosive action of most acidic, basic and organic mediums. Cathodes for use in anodic protection systems contemplated by the instant invention are generally constructed of noble metals, such as platinum. However, ferrous metals and ferrous alloys can be used in cathode construction if the cathode is properly sized so that in the course of anodically protecting the anode, the cathode is simultaneously and completely cathodically protected.

In the application of anodic passivation techniques to the protection of active-passive metals, it is generally observed that starting from the active state of the metal and progressing to the more noble region of potential, the anodic current density increases to a peak value ($I_{cr}$) at a potential value called the critical passivating potential ($E_p$). Beyond the critical passivating potential, the current density decreases and the metal becomes passive (passive region). Further change of potential usually results in a little or no further change of current density ($I_p$), and the dissolution rate of the anode is orders of magnitude lower than in the active region.

The current density to achieve passivity is affected by the rate of potential change $\Delta E/\Delta t$ (change of potential with respect to time) in going from active to passive potential. When $\Delta E/\Delta t$ is very small, e.g. smaller than approximately 3 volts/hr., the current density to achieve passivity approaches a steady state value called the critical current density for passivity ($I_{cr}$) which represents the minimum current density to passivate at very low speeds of polarization. When $\Delta E/\Delta t$ is very large, the current density to passivate approaches the maximum current for passivity ($I_m$) which represents the current density to instantaneously passivate.

Because of the above-mentioned phenomena, application of anodic passivation techniques to the protection of large scale commercial equipment presents serious process problems. The critical passivating current ($I_{cr}$) and the maximum current for passivity ($I_m$) have in the past limited, to a certain extent, the size of the equipment which can be successfully protected because reliable instrumentation was not available for applications which required large amounts of current to overcome $I_{cr}$ or $I_m$ and also the sensitivity to maintain the metallic surface within the passive potential range when solution concentration or temperature changes called for a response from the potentiostat to alter current levels to maintain the anode within the passive potential range.

In general, two factors must be considered in applying anodic protection techniques to industrial equipment. The electrical system used must have sufficient current capacity to overcome values of $I_{cr}$ and $I_m$ of the active-passive metal in the particular corrosive medium and also must be adapted to respond to maintain the metallic surface within the passive potential range when solution concentration and temperature vary, thereby necessitating a change in the amount of current necessary to maintain the anode within the passive potential range. It has been found that potentiostatic devices serve well in maintaining the anode within the passive potential range when system variations require a current change to maintain the anode within the passive potential range. While these devices serve well in this capacity, potentiostats have not been developed which have sufficient current capacity to overcome the high values of $I_{cr}$ and $I_m$ needed to passivate large commercial equipment. The values of $I_{cr}$ and $I_m$ can vary from 10 amps to several hundred amps depending upon the metallic area to be passivated. The passivating current, $I_p$, again depending upon the metallic area being passivated, is generally a low value in the range of 0.01 to 20 amps. Thus, it can readily be seen that a definite problem exists in applying anodic protection techniques to industrial equipment. System variations require the use of a potentiostat or similar devices to maintain the anode within the passive potential range and high values of current above and beyond the capacity of commercially available potentiostatic devices are necessary to bring the anode within the passive potential range.

It is, therefore, the principal object of this invention to provide an efficient and economical potentiostat-power supply system suitable for use in industrial anodic protection systems.

Another object of this invention is to provide a method of combining potentiostatic devices and direct current power sources suitable for use in applying anodic protection techniques to industrial equipment.

A further object of this invention is to provide a method and apparatus suitable for the instantaneous passivation of industrial equipment.

Further objects of this invention will be apparent from the following specification when considered together with the accompanying drawings.

The present invention is directed to the simultaneous use of a low current capacity potentiostat connected in parallel with a direct current power source. In operation, the potentiostat, which may be of any suitable type having sufficient current capacity to maintain the anode being protected within the passive potential range, is connected in parallel to a direct current power source to the anode and cathode of the system. A suitable reference electrode is also electrically connected to the potentiostat and is in electrochemical contact with the corrosive medium in which the anode and cathode are immersed.

A predetermined amount of direct current is then supplied to the cathode from the power source and potentiostat until the value of $I_{cr}$ or $I_m$ of the anode is reached. When the potential value of the anode with respect to the reference electrode, corresponding to the current value of $I_{cr}$ or $I_m$, is reached, the direct current power source is turned off and the potentiostat continues its operation and maintains the anode within the passive state provided that the maximum current output of the potentiostat is equal to or higher than the total current necessary to maintain the passive condition of the anode.

Any commercially available direct current source is suitable for the above operation provided that it is capable of supplying a current necessary to supplement the current output of the potentiostat for the particular service required. For application in anodic protection systems, the direct current power source must be able to develop a 5 to 10-volt driving force and for some systems should have an output of up to several hundred amperes. The potential necessary for any particular passivating service depends upon the size and nature of the anode and cathode, the degree of polarization of the anode, and the IR drop through the electrolyte, surface film and external circuit.

The present invention will be more readily understood by reference to the accompanying drawings.

The current supply and potential control system, as contemplated by the instant invention, is applicable for use in a wide variety of situations where metallic surfaces suffer corrosion due to chemical attack. Process reactors, storage equipment, boilers, and acid concentrators are examples of equipment whose service life may be materially extended by applying anodic protection techniques utilizing the system of the instant invention.

Figure 1:
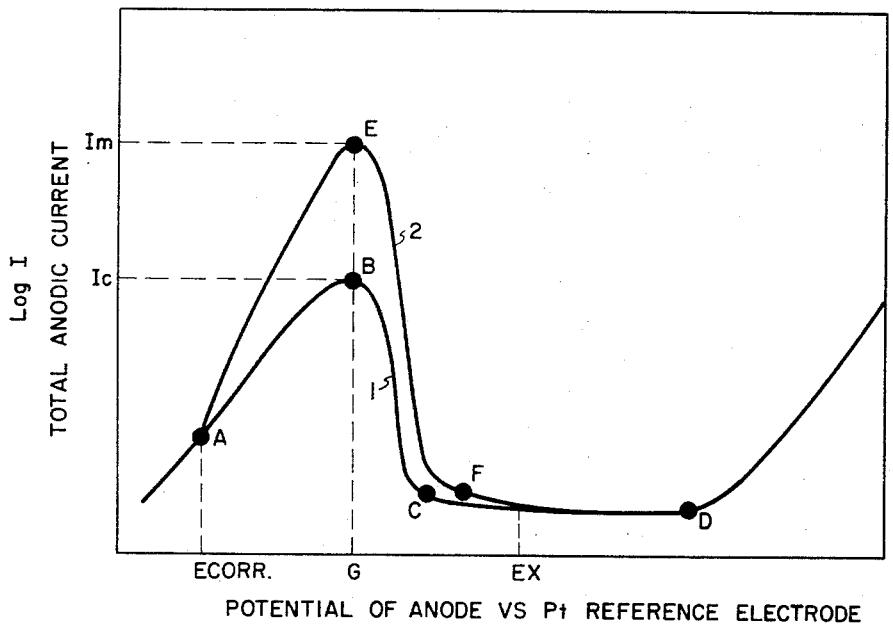
FIGURE 1 is a schematic drawing illustrating anodic polarization curves for steady-state and instantaneous passivation of active-passive metals.

Referring to the drawings in detail and more particularly to FIGURE 1, Curve 1 illustrates the relationship between total anodic current and the potential of the active-passive metal connected as anode with respect to reference electrode as obtained when the potential of the anode is changed at a small rate with respect to time.

Curve 2 illustrates the relationship between total anodic current required to passivate the anode and the potential of the anode with respect to a reference electrode when the potential of the anode is instantaneously changed from its normal corrosive value to a point within the passive potential range.

The operation of the instant invention can be readily demonstrated by referring to Curve 1. Point A designates the normal corrosive state of an active-passive metal in a conductive fluid. In steady-state operation, where the potential of anode is changed at a slow rate (i.e. less than 3 votes per hour), the potentiostat and the direct current power source together supply current sufficient to overcome the critical passivating current of the metal which is designated by Point B. As the potential of the anode is brought to more noble values, the current required by the system rapidly decreases until a point is reached within the passive potential range where a further change of the potential of the anode with respect to the reference electrode usually results in a little or no further change of current density through the electrodes. Point C designates the beginning of the passive potential region. Within the passive potential range the current necessary to maintain the passive conditions of the metal can, in most applications, be supplied by a low current capacity potentiostat.

Curve 2 illustrates the current-voltage pattern for the instantaneous passivation of an active-passive metal. In instantaneous passivation operations, the potential of the anode is rapidly changed from its normal corrosive value designated by Point A to a value within the passive potential range designated by Point F. The instant invention is especially operable to instantaneous passivation techniques, in that, the direct current power source can readily supply the high values of current needed to passivate the anode instantaneously and the low current capacity potentiostat may be successfully utilized to maintain the metal within the passive potential region. On Curve 2, Point E designates the maximum current value necessary for passivation. As the potential of the anode is increased to more noble or more cathodic values the passivating current rapidly increases and then decreases to a point where a further change in potential of the anode with respect to the reference electrode results in a negligible change of current density through the electrodes. Point F designates the beginning of the passive potential range for instantaneous operation. As the potential is increased to more noble or cathodic values, a point is reached where the passivating current again increases with increasing potential values. Point D designates the beginning of the transpassive region of the active-passive metal.

Figure 2:
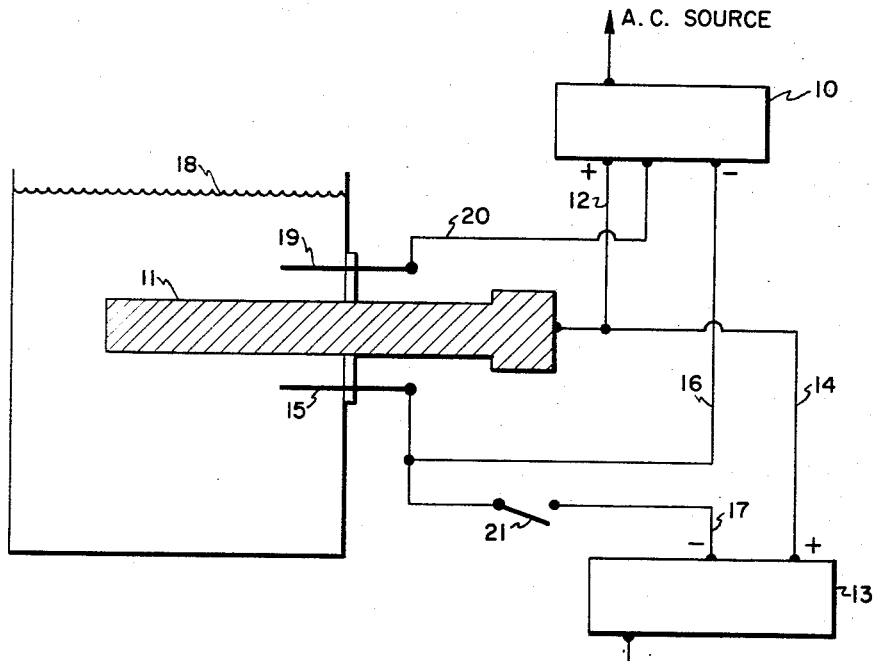
FIGURE 2 is a diagrammatic representation illustrating one method of applying the instant invention.
Figure 3:
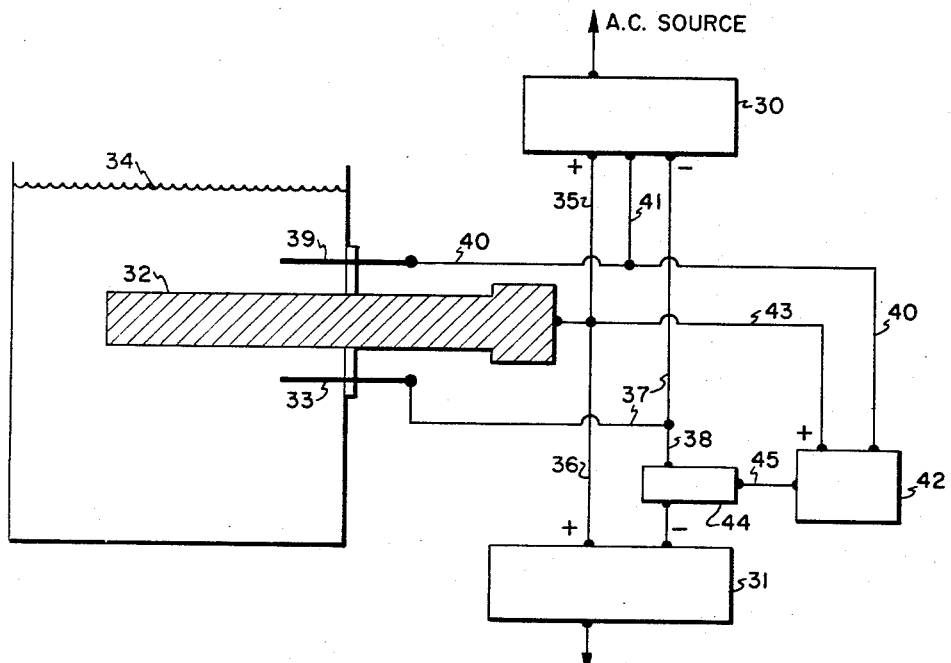
FIGURE 3 is a schematic representation of another embodiment of the instant invention.

By way of example, and not by way of limitation, FIGURES 2 and 3 illustrate the use of the present invention for the protection of a bayonet heater in acid concentration service. By the present embodiment (FIGURE 2) potentiostat 10, which may be of any suitable type, and in the preferred embodiment of this invention is a low current capacity analytical instrument having a maximum current capacity of 10 amps, has its positive terminal connected to the bayonet heater 11 by means of electrical conduit 12. The positive pole of the direct current power source 13 is electrically connected to the bayonet heater 11 by means of electrical conduit 14. Direct current power is supplied to the system to be protected from the potentiostat 10 and direct current power source 13 which are connected in parallel with cathode 15 by means of electrical conduits 16 and 17 which are electrically connected to the negative terminals of the potentiostat and power source. The electrochemical state of the anode-corrosive solution interface is determined by means of a reference electrode 19 in contact with the corrosive solution 18. The potential value measured by the reference electrode is transmitted to the potentiostat of the system by electrical conduction means 20.

In the operation of the system described in FIGURE 2, direct current is supplied to the anode by way of the cathode from the potentiostat and direct current power source in amounts sufficient to overcome $I_{cr}$ or $I_m$ of the system depending upon whether or not steady-state or instantaneous passivation techniques are utilized. After the bayonet heater is brought to the potential value corresponding to $I_{cr}$ or $I_m$, switch 21 located in the supply line of the direct current power source is opened and the current necessary to maintain the passive conditions of the anode is supplied by the potentiostat providing that the instrument has sufficient current capacity to supply the passivating current requirements of the anode which is being protected.

As stated previously, the potentiostat may be of any suitable type such as for example an analytical instrument potentiostat (maximum current capacity—10 amps) manufactured by Analytical Instruments, Inc., or an Anotrol Potentiostat (maximum current capacity—25 amps), Model Series 6300, manufactured by the Anotrol Division of the Continental Oil Co. In operation, the potentiostat is preset at a potential value $U_s$ within the passive potential range of the anode being protected. This assigned potential value $U_s$ is compared in the comparator circuits with the existing potential $U_i$ as measured between the reference electrode and anode. The difference $dU = U_s - U_i$ is amplified to $V_0 dU$ in the voltage amplifier of the system. This amplified difference potential controls the power amplifier. This instrument furnishes the current which flows from the cathode to anode which is necessary to make the actual potential value $U_i$ equal to the assigned value $U_s$.

FIGURE 3 illustrates apparatus suitable for the automatic operation of the instant invention. Referring to the figure, potentiostat 30 and the direct current power source 31 are connected in parallel with bayonet heater 32 and cathode 33 which are directly immersed in acid solution 34. The positive terminals of potentiostat 30 and power source 31 are electrically connected to bayonet heater 32 by means of electrical conduits 35 and 36. Direct current power is supplied to the cathode of the system by electrical conduits 37 and 38 which are electrically connected to the negative terminals of potentiostat 30 and direct current power source 31. The electrochemical state of the anode-corrosive solution interface is determined by reference electrode 39 which is in contact with the corrosive solution 34. The potential value recorded by the reference electrode 39 is transmitted to the potentiostat 30 by means of electrical conduit 40 and electrical conduit 41 and also to contact controller 42 by means of lead wire 40. Contact controller 42 may be of any suitable type, and in the preferred embodiment of this invention is a single-record electric contact controller such as for example a Series 153–C10 controller manufactured by Minneapolis-Honeywell. Controller 42 is electrically connected to the anode 32 by means of wire 43. Electrical contact controller 44, located in power supply line 38 operates on signals transmitted by controller 42 and carried by wire 45. The electrical contact controller may be of any suitable type, and in the preferred embodiment is a two zone single contact such as for example a mercury switch type Electric Contact Control manufactured by Minneapolis-Honeywell Regulator Company.

In the operation of the system of FIGURE 3 the potentiostat is preset at a potential value within the passive potential range of the active-passive metal connected as anode, and the contact controller is preset at a potential value corresponding to point G of FIGURE 1. During passivation of the anode, wherein the potential of the anode with respect to the reference electrode is a value more positive or more active than the set point (point G of FIGURE 1) of the controller, the electrical contact remains closed and both the potentiostat and direct current power source supply the current necessary to bring the anode to a potential corresponding to $I_{cr}$ or $I_m$. When the potential of the anode with respect to the reference electrode becomes more negative or noble than the set point, the controller automatically opens the electrical contact thus removing the direct current power source from the current supply system, and the potentiostat, providing it is of sufficient current capacity, supplies current sufficient to maintain the passive condition of the anode. The above cycle is repeated if temperature and solution concentration alterations cause the potential of the anode with respect to the reference electrode to be shifted to a value more positive than the set point of the controller.

While the present invention has been described in connection with the anodic protection of bayonet heaters in acid concentration service, the power supply-control system is readily applicable to all types of anodic protection systems wherein the rate of corrosion of active-passive metals in contact with corrosive solutions is materially diminished by the impression of an external current on the material connected as anode.

*Example 1*

The operability of the present system was demonstrated in an operation wherein an analytical potentiostat instrument was connected in parallel with a D.C. power source to provide the necessary current requirements to anodically protect an Alloy 20 bayonet heater in acid concentration service. The electrolyte used in the test was 65% field sulfuric acid. The acid and bayonet temperature were maintained at a temperature of 265° F. From previous laboratory experiments the value of $I_{cr}$ for the bayonet was determined to be $3 \times 10^{-2}$ amps./centimeter$^2$ and $I_p$ was $2 \times 10^{-4}$ amps/centimeter$^2$. The total area of the bayonet heater immersed in the acid solution was 730 centimeters$^2$, and the total current necessary to passivate the bayonet was 21.9 amps.

The total maximum current that can be drawn from the analytical instrument is 10 amps and the additional 11.9 amps were supplied by connecting a direct current power source in parallel with the potentiostat. The direct current power source used was able to supply a maximum current of 22 amperes up to 10 volts and with a short term overload of up to 30 amperes. A 3 volt working or applying voltage was necessary to overcome the resistance of th system and to develop the necessary passivating current of 11.9 amperes.

In operation the potentiostat was preset at a potential of 0.10 volt vs. platinum reference electrode. This potential is within the passive potential range of the Alloy 20 anode as determined by laboratory polarization studies. The D.C. power source was then connected in parallel with the potentiostat and both sources supplied the current to the anode by way of the cathode of approximately 21.9 amps. The steady-state operation was used to bring the potential of the anode from its normal corrosive state to a point within the passive potential range of the anode. When the potential of the anode reached a value of 0.10 volt vs. platinum reference electrode, the direct current power source was turned off and the passive state of the anode was maintained by a current supplied from the potentiostat. The total current necessary to maintain the anode within the passive potential range was 0.146 amp.

Having thus described the preferred embodiments of the present invention, it is understood that it embraces such other variations and modifications as come within the spirit and scope thereof. The invention is defined by the claims appended hereto.

What is claimed is:

1. A method for achieving substantially instantaneous anodic passivation of a large metallic structure having a maximum current requirement or passivation in excess of the output of an individual commercial potentiostat comprising the following steps in combination:
   (a) connecting said metallic structure to an electrical circuit containing at least one cathode, one reference electrode and one contact controller wherein said metallic structure serves as the anode of said circuit,
   (b) supplying a composite current between said anode and said cathode, said composite current comprising a first portion of current supplied from a potentiostatic device and a second portion of current supplied from a direct current power source, said potentiostatic device and said power source being connected in parallel, said composite current being of a magnitude in excess of that required for achieving substantially instantaneous passivation of said metallic structure connected as anode,
   (c) automatically sensing when said structure connected as anode is within the desired potential range for anodic protection,
   (d) automatically switching off said second portion of current supplied from said direct current power source when the potential of said anode with respect to said reference electrode becomes more negative than the set point of said contact controller and thereafter,
   (e) maintaining by means of said potentiostat, the potential of said structure within the desired range.

2. A method for achieving substantially instantaneous anodic passivation of a large surface area metallic bayonet heater structure having a maximum current requirement for passivation in excess of the output of an individual commercial potentiostat comprising the following steps in combination:

(a) connecting said bayonet heater structure to an electrical circuit containing at least one cathode, one reference electrode and one contact controller wherein said heater structure serves as the anode of said circuit, (b) supplying a composite current between said anode and said cathode, said composite current comprising a first portion of current supplied from a potentiostatic device and a second portion of current supplied from a direct current power source, said potentiostatic device and said power source being connected in parallel, said composite current being of a magnitude in excess of that required for achieving substantially instantaneous passivation of said structure connected as anode, (c) automatically sensing when said structure connected as anode is within the desired potential range for anodic protection, (d) automatically switching off said second portion of current supplied from said direct current power source when the potential of said anode with respect to said reference electrode becomes more negative than the set point of said contact controller and thereafter, (e) maintaining by means of said potentiostat, the potential of said structure within the desired range.

References Cited
UNITED STATES PATENTS

| | | | |
|---|---|---|---|
| 1,020,480 | 3/1912 | Cumberland | 204—196 |
| 1,984,899 | 12/1934 | Smith | 204—147 |
| 2,723,340 | 11/1955 | Boggs et al. | 204—196 |
| 3,056,879 | 10/1962 | Fischer | 204—196 |
| 3,176,115 | 3/1965 | Balis | 204—196 |
| 3,208,925 | 9/1965 | Hutchinson et al. | 204—196 |

OTHER REFERENCES

Subbury et al., "Corrosion," vol. 16, No. 2, February 1960, pp. 47t–54t.

JOHN H. MACK, *Primary Examiner.*

T. TUNG, *Assistant Examiner.*